(12) United States Patent
Patgar et al.

(10) Patent No.: US 10,387,204 B2
(45) Date of Patent: Aug. 20, 2019

(54) RESOURCE POOLING IN A VIRTUALIZED CLOUD CONTAINER ENVIRONMENT

(71) Applicant: INTERNATIONAL BUSINESS MACHINES CORPORATION, Armonk, NY (US)

(72) Inventors: Yogesh G. Patgar, Bangalore (IN); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/593,491

(22) Filed: May 12, 2017

(65) Prior Publication Data

US 2018/0329757 A1    Nov. 15, 2018

(51) Int. Cl.
*G06F 9/46* (2006.01)
*G06F 9/50* (2006.01)
*G06F 9/455* (2018.01)

(52) U.S. Cl.
CPC ........ *G06F 9/5027* (2013.01); *G06F 9/45558* (2013.01); *G06F 9/5038* (2013.01); *G06F 9/5077* (2013.01); *G06F 2009/4557* (2013.01)

(58) Field of Classification Search
CPC .. G06F 9/5027; G06F 9/5077; G06F 9/45558; G06F 2009/4557; H04L 12/4675
See application file for complete search history.

(56) References Cited

U.S. PATENT DOCUMENTS

| 8,589,557 | B1 | 11/2013 | Labat et al. | |
|---|---|---|---|---|
| 9,256,467 | B1 | 2/2016 | Singh et al. | |
| 2012/0259982 | A1* | 10/2012 | Tatsubori | G06F 9/5027 709/226 |
| 2016/0371127 | A1* | 12/2016 | Antony | G06F 9/5077 |

(Continued)

FOREIGN PATENT DOCUMENTS

WO    2015137975 A1    9/2015

OTHER PUBLICATIONS

Rolia et al., "Supporting Application QoS in Shared Resource Pools," HPL-2006-1, Hewlett-Packard Development Company, L.P., Dec. 22, 2005.

(Continued)

*Primary Examiner* — Tuan A Vu
(74) *Attorney, Agent, or Firm* — Patterson + Sheridan, LLP (57) ABSTRACT

Method and apparatus for resource pooling. Embodiments receive allocation information for a plurality of containers. Each of the plurality of containers is assigned to one of a plurality of groups. The allocation information specifies, for each of the plurality of groups, a respective number of physical CPUs to allocate to the group. A plurality of virtual resource pools are crated based on the allocation information wherein a single virtual resource pool is created for each of the plurality of groups. Embodiments create a container resource group mapping based on the allocation information. The container resource group mapping is a mapping between one or more physical CPUs in a shared processor (Continued)

pool and the plurality of virtual resource pools. Embodiments provide resources from the one or more physical CPUs to the plurality of containers according to the container resource group table and the virtual resource pools.

20 Claims, 8 Drawing Sheets

(56) References Cited

U.S. PATENT DOCUMENTS

2016/0378563 A1* 12/2016 Gaurav ................. G06F 9/5077
                                                           718/1
2017/0170990 A1*  6/2017 Gaddehosur ........ H04L 12/4675

OTHER PUBLICATIONS

Garg et al., "SLA-Based Virtual Machine Management for Heterogeneous Workloads in a Cloud Datacenter," Journal of Network and Computer Applications 45 (Oct. 2014): 108-20, Elsevier.

* cited by examiner

CONTAINER RESOURCE GROUP TABLE 401

| TENANT ID ACCOUNT / CLUSTER ID / GROUP ID | CONTAINER (SERVER ID: VM ID) | VIRTUAL CPU (SERVER ID: VM ID: CPU ID) |
|---|---|---|
| VPP 250A | 205A(1:201C), 205B(1:201C), 205C(1:202C) | 215(1:201C: 230A), 216(1:201C: 230B), 217(1:201C: 230C), 218(1:202C: 230A), 219(1:202C: 230B), 220(1:202C: 230C) |
| VPP250B | 210A(1:201C), 210B(1:202C), 210C(1:202C) | 221(1:201C: 231A), 222(1:201C: 231B), 223(1:202C: 231A), 224(1:202C: 231B) |

VPP 250A

| CONTAINER | CPU SHARE | PRIORITY |
|---|---|---|
| 205A | 1 | 255 |
| 205B | 0.75 | 100 |
| 205C | 1.25 | 50 |

VPP 250B

| CONTAINER | CPU SHARE | PRIORITY |
|---|---|---|
| 210A | 0.5 | 150 |
| 210B | 1 | 75 |
| 210C | 0.5 | 255 |

RESOURCE POOLING IN A VIRTUALIZED CLOUD CONTAINER ENVIRONMENT

BACKGROUND

The present disclosure relates to virtual containers, and more specifically, to pooling resources among virtual containers in a cloud computing environment.

A large number of individuals and organizations use virtualized cloud computing environments to run a multitude of applications and services. A server operating as a part of such a cloud system may act as a host for one or more virtual machines or logical partitions (LPARs), each of which may host one or more containers, such as Dockers, workload partitions (WPARs), or other similar structures. These containers can be used to run the specific applications, middleware, or other programs that a client requires.

SUMMARY

Embodiments of the present disclosure provide a method and system for pooling resources. The method and system include receiving allocation information for a plurality of containers, wherein each of the plurality of containers are assigned to one of a plurality of groups, and wherein the allocation information specifies, for each of the plurality of groups, a respective number of physical central processing units (CPUs) to allocate to the group. Upon receiving the allocation information, the method and system include creating a plurality of virtual resource pools based on the allocation information wherein a single virtual resource pool is created for each of the plurality of groups. The method and system further include creating a container resource group mapping based on the allocation information, wherein the container resource group mapping is a mapping between one or more physical CPUs in a shared processor pool and the plurality of virtual resource pools. Finally, the method and system include providing resources from the one or more physical CPUs to the plurality of containers according to the container resource group table and the virtual resource pools.

DETAILED DESCRIPTION

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

Cloud computing environments are used by a variety of clients for a variety of applications and services. Similarly, the use of virtual machines has proved to be valuable in a variety of situations. Virtualized cloud computing systems can thus help a diverse assortment of clients to satisfy their computing needs. In some embodiments of the present disclosure, clients or tenants of a cloud system may require a number of applications or middleware to be run on the cloud, on a variety of operating systems. For example, a single client may require five instances of one program running on two different operating systems, as well as three instances of a second program on those same two operating systems.

In some embodiments, these applications are run using individual containers hosted by the virtual machines that are hosted on the server. In such an embodiment, the system provides physical resources of the server, such as physical CPUs, to the applications through a hypervisor. Conventional solutions enable resources such as physical CPUs to be shared between multiple virtual machines on a single server. However, there is no existing methodology to control which container on a virtual machine makes use of which resources that are provided to it. This can be problematic, as multiple containers may be hosted on a single virtual machine, and these containers may correspond to different users, e.g., who may request dedicated CPUs for processing their containers. For instance, a client or tenant may be limited to a predefined amount of resources that they may use because of their budget or other considerations. For example, a client may only be able to afford three licenses or cores, and thus must determine how to distribute their required computing across the multiple virtual machines and containers. As conventional solutions do not enable specific containers running on a virtual machine to be mapped to specific physical CPUs and only enable the mapping of the virtual machine itself to physical CPUs, this can prevent cloud providers from hosting containers for multiple different clients on the same virtual machine. While instantiating separate virtual machines for each container can enable the cloud provider to indirectly map the containers to physical CPUs, doing so eliminates many of the benefits of using containers in a cloud computing environment.

Figure 1:
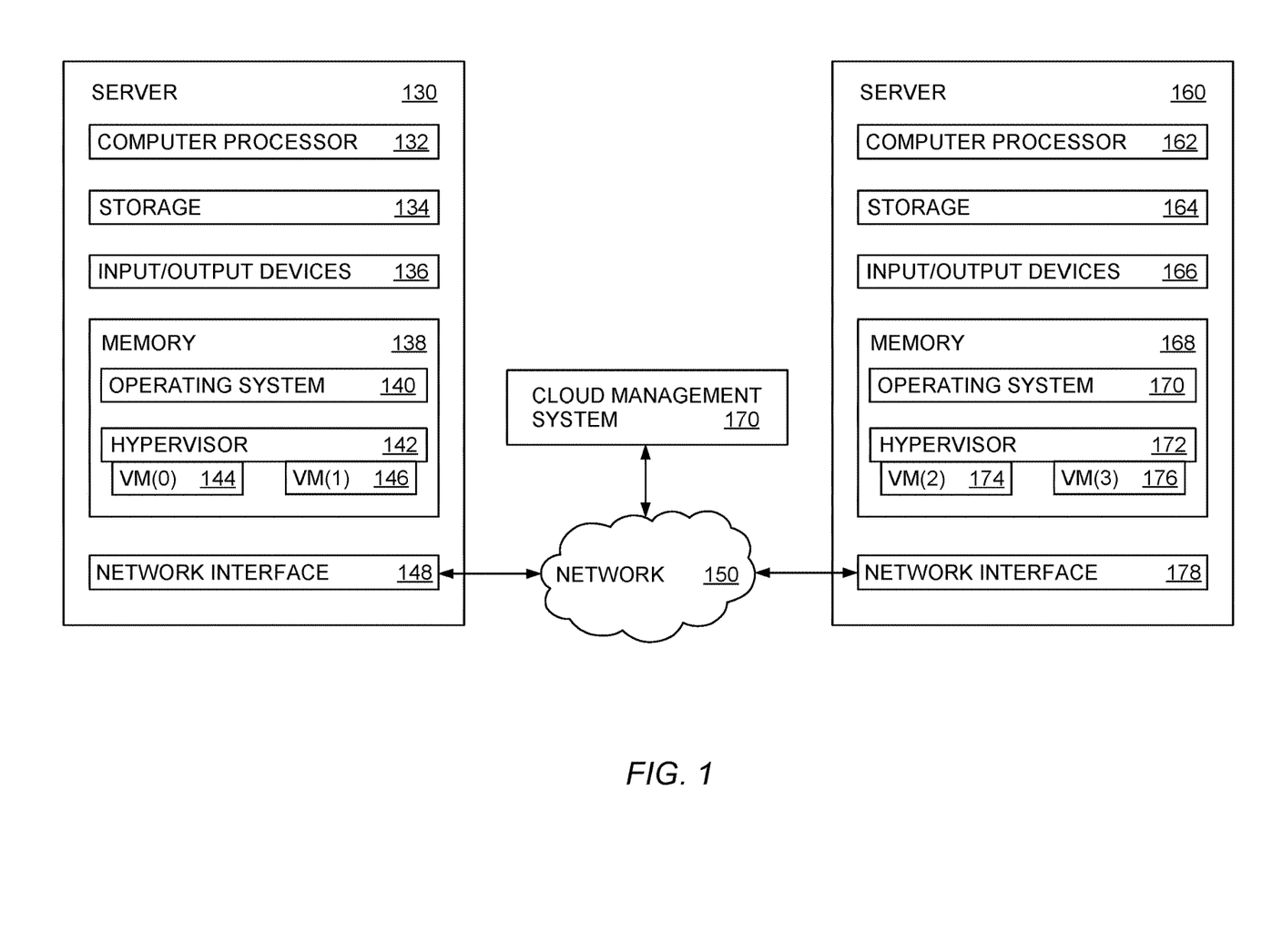
FIG. 1 illustrates a block diagram of a system configured to implement one embodiment of the present disclosure.

FIG. 1 illustrates a block diagram of a system configured to implement one embodiment of the present disclosure. FIG. 1 contains a Server 130 and a Server 160, linked by a Network 150. Network 150 may be any manner of communication between physical servers, including an intranet, the internet, or any other manner of communication. The Network 150 may utilize wireless links, wired links, and/or fiber optics. Server 130 and Server 160 communicate using Network Interfaces 148 and 178, respectively. Though two Servers 130 and 160 are illustrated, some embodiments of the present disclosure are implemented on a single Server 130 without regard to whether other servers exist in the system or not. Similarly, though FIG. 1 illustrates two distinct servers, some embodiments of the present disclosure involve more than two servers. Server 130 is illustrated as a single physical server, but in some embodiments, Server 130 is actually a series of physical servers acting as a cluster collectively configured to implement embodiments of the present disclosure.

Server 130 contains a Computer Processor 132, which may contain a number of separate cores. Additionally, though a single Computer Processor 132 is pictured, Server 130 includes a plurality of Computer Processors 132 in some embodiments of the present disclosure. As illustrated, Server 130 also contains Storage 134, Input/Output devices 136, and Memory 138. In FIG. 1, Memory 138 comprises an Operating System 140 and Hypervisor 142. Hypervisor 142 is configured to host one or more virtual machines, such as VM(0) 144 and VM(1) 146. In some embodiments, Hypervisor 142 provides physical resources to the various virtual machines running on Server 130, and controls their access to such resources. Though Hypervisor 142 is illustrated as software in Memory 138, Hypervisor 142 is implemented as hardware in some embodiments of the present disclosure, and is firmware in other embodiments.

Server 160 contains Computer Processor 162, Storage 164, Input/Output Devices 166, Memory 168, and Network Interface 178. Memory 168 contains Operating System 170 and Hypervisor 172, while Hypervisor 172 runs VM(2) 174 and VM(3) 176. Each element of Server 160 performs identical functions to its corresponding structure of Server 130, and detailed description of each is not required.

As illustrated, FIG. 1 also contains a component labeled Cloud Management System 170 communicatively coupled with Network 150. In embodiments of the present disclosure, Cloud Management System 170 manages allocation of physical CPUs to virtual machines, as will be discussed below in more detail with reference to FIG. 2. In some embodiments, Cloud Management System 170 operates as illustrated, on a separate machine from each of the serves in the cloud system. In some embodiments, Cloud Management System 170 may operate on a single server, such as Server 130 or Server 160, but still manage resource allocation across the entire system. In some embodiments, the duties of Cloud Management System 170 are split across multiple physical machines or servers, but each disparate physical component nevertheless operates jointly as a unified Cloud Management System, as illustrated. Cloud Management System 170 may be implemented with software, hardware, or a combination of the two.

Figure 2:
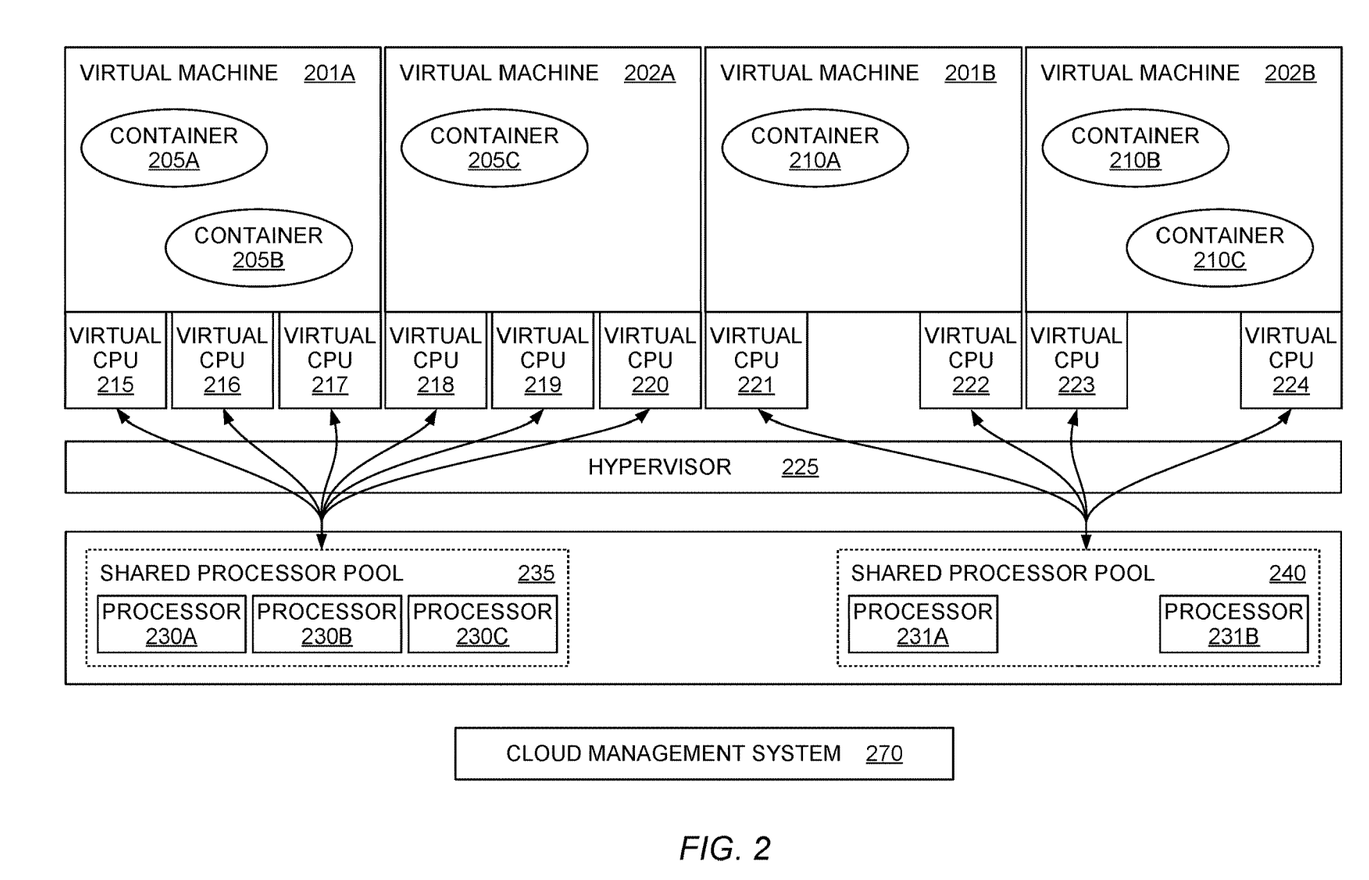
FIG. 2 is a block diagram of a virtualized cloud computing environment configured to implement one embodiment of the present disclosure.

FIG. 2 illustrates a virtualized cloud computing environment with multiple virtual machines running on a single server. In the illustrated embodiment, Virtual Machine 201*a* hosts Container 205*a* and Container 205*b*. Containers 205*a* and 205*b* may be different instances of the same application, both being run for a single specific client or cloud tenant. Virtual Machine 201*a* provides computing resources to Containers 205*a* and 205*b* using Virtual CPU 215, 216, and 217. Thus, to an application running on Virtual Machine 201*a* (such as in Container 205*a*), Virtual CPU 215 appears to be a physical CPU. In the illustrated embodiment, Virtual Machine 201*a* is hosted on a physical server that contains physical Processors 230*a*, 230*b*, 230*c*, 231*a*, and 231*b*. The physical Processors are allocated to two Shared Processor Pools 235 and 240, with Processors 230*a*, 230*b*, and 230*c* allocated to the former while Processors 231*a* and 231*b* are allocated to the latter. In the illustrated embodiment, Cloud Management System 270 is a separate component in the cloud that is used to coordinate the allocation of physical CPUs to virtual machines, as will be discussed in more detail below with reference to FIG. 3. In some embodiments, Cloud Management System 270 may be split across multiple physical machines. In some embodiments, Cloud Management System 270 is a component present on each physical server. In such an embodiment, the separate Cloud Management Systems may each communicate with each other to ensure synchronization between the various servers.

As illustrated, Shared Processor Pool 235 is associated with Virtual Machine 201*a* and Virtual Machine 202*a*. That is, Hypervisor 225 allows Virtual Machines 201*a* and 202*a* to use Shared Processor Pool 235 to operate. Thus, applications in Containers 205*a*, 205*b*, and 205*c*, working through Hypervisor 225, have access to the time/cycles of Processors 230*a*, 230*b*, and 230*c*. As discussed above, Virtual CPUs 215, 216, and 217 appear to be physical processors to any process operating within Virtual Machine 201*a*. Similarly, Container 205*c* sees Virtual CPUs 218, 219, and 220 as if they were physical processors. Hypervisor 225 provides the resources of Processors 230*a*, 230*b*, and 230*c* to Virtual Machine 202*a* in the same manner as discussed above. In some embodiments, the number of virtual processors is equal to the number of physical processors allocated to the virtual machine. In other embodiments, however, there may be more virtual processors than physical processors, in order to accommodate the given situation. The allocation and distribution of virtual processors is discussed in more detail below.

Similarly, Shared Processor Pool 240 is associated with Virtual Machines 201*b* and 202*b*, and thus Hypervisor 225 provides resources, including time or cycles, from Processors 231*a* and 231*b* to Virtual Machines 201*b* and 202*b*. Likewise, Container 210*a* uses Virtual CPU 221 and 222 as if it was a physical CPU, and the needed resources are provided by the underlying hardware. Containers 210*b* and 210*c* similarly use Virtual CPUs 223 and 224 to run the various applications and processes that may be required.

As illustrated in FIG. 2, Virtual Machine 201*a* and 201*b* are each running the same operating system. This operating system could be Windows, Linux, AIX, or any other operating system. Similarly, Virtual Machines 202*a* and 202*b* are running the same operating system. In the illustrated figure, the operating system run by Virtual Machines 202*a* and 202*b* is distinct from the operating system run by Virtual Machines 201*a* and 201*b*. As pictured, Containers 205*a*, 205*b*, and 205*c* are of the same group. Containers may be part of a single group for a variety of reasons. For example, grouping may be based on client need or limitations of the architecture. In some embodiments, containers of the same group run the same program, application, middleware, or process, but potentially on different operating systems. Similarly, Containers 210*a*, 210*b*, and 210*c* are in a single group of containers.

Thus, the illustrated figure depicts a system with a tenant/client who requires three instances of one application (or various applications within a single logical group) running (in Containers 205*a*, 205*b*, and 205*c*), with two of those instances on operating system A (using Virtual Machine 201*a*) and one instance running on a different operating system B (using Virtual Machine 202*a*). In the depiction, the client also requires three instances of a second application, or various applications that are nevertheless within the same group (Containers 210a, 210b, and 210c), with one instance running in operating system A (using Virtual Machine 201b) and two instances on operating system B (using Virtual Machine 202b).

In many embodiments, as illustrated, the client has a limited number of core licenses they can use. That is, the client is not entitled to unlimited processor cores, cycles, or time on processors, but only pays for a limited number. In FIG. 2, the client has five licenses: three for use with Containers 205a, 205b, and 205c, and two for use with Containers 210a, 210b, and 210c. Thus, in the illustrated figure, the client pays for five licenses to have the use of Processors 230a, 230b, 230c, 231a, and 231b. In some instances, it would be optimal to combine Virtual Machines 201a and 201b, and to combine Virtual Machines 202a and 202b into a single virtual machine. Doing so is not possible with conventional solutions, however, because it is not possible to assign more than one shared processor pool to a single virtual machine. That is, once a shared processor pool is assigned to a virtual machine, the virtual machine may access every physical processor in the shared processor pool, and there is no existing mechanism for Hypervisor 225 to restrict which physical processors may be used by each container within the virtual machine. Thus, although Virtual Machines 201a and 201b run the same operating system, it is not possible to consolidate them into a single virtual machine because it would require extra core licenses that the client does not have.

As discussed above, each virtual machine has no control over which physical processor each container uses, because it has no knowledge of the underlying hardware. Similarly, Hypervisor 225 can ensure that each virtual machine has access to all of the processors in its assigned shared processor pool, but it has no control over which physical processor each application, process, or container within each virtual machine uses, because the knowledge of resource allocations and groups is not accessible to it. Thus, if Virtual Machines 201a and 201b were to be combined using existing architecture, Container 210a would have access to processors intended to be reserved for Containers 205a and 205b. Similarly, Containers 205a and 205b would have access to resources from physical processors that should be reserved for Container 210a.

This overlap can be problematic for a variety of reasons. If Container 205b is using fewer clock cycles or less processing time during a particular period, for example because it is not processing much data or because it is in a slower phase of computing, the extra processing power available on Processors 230a, 230b, and 230c should be made available to Container 205a because it is of the same group as Container 205b and the client intended them to share those cores. Using conventional systems, however, the "donated" cycles from Processors 230a, 230b, and 230c can be used by Container 210a, which is contrary to the intended architecture. Thus, efficient and accurate resource allocation is not possible on the consolidated virtual machines, and a cloud system is required to run multiple virtual machines with the same operating system in order to ensure the client's needs are met. This wastes computing resources and is inefficient. Thus, Cloud Management System 270 can be used to solve existing problems, as discussed below in reference to FIG. 3.

Figure 3:
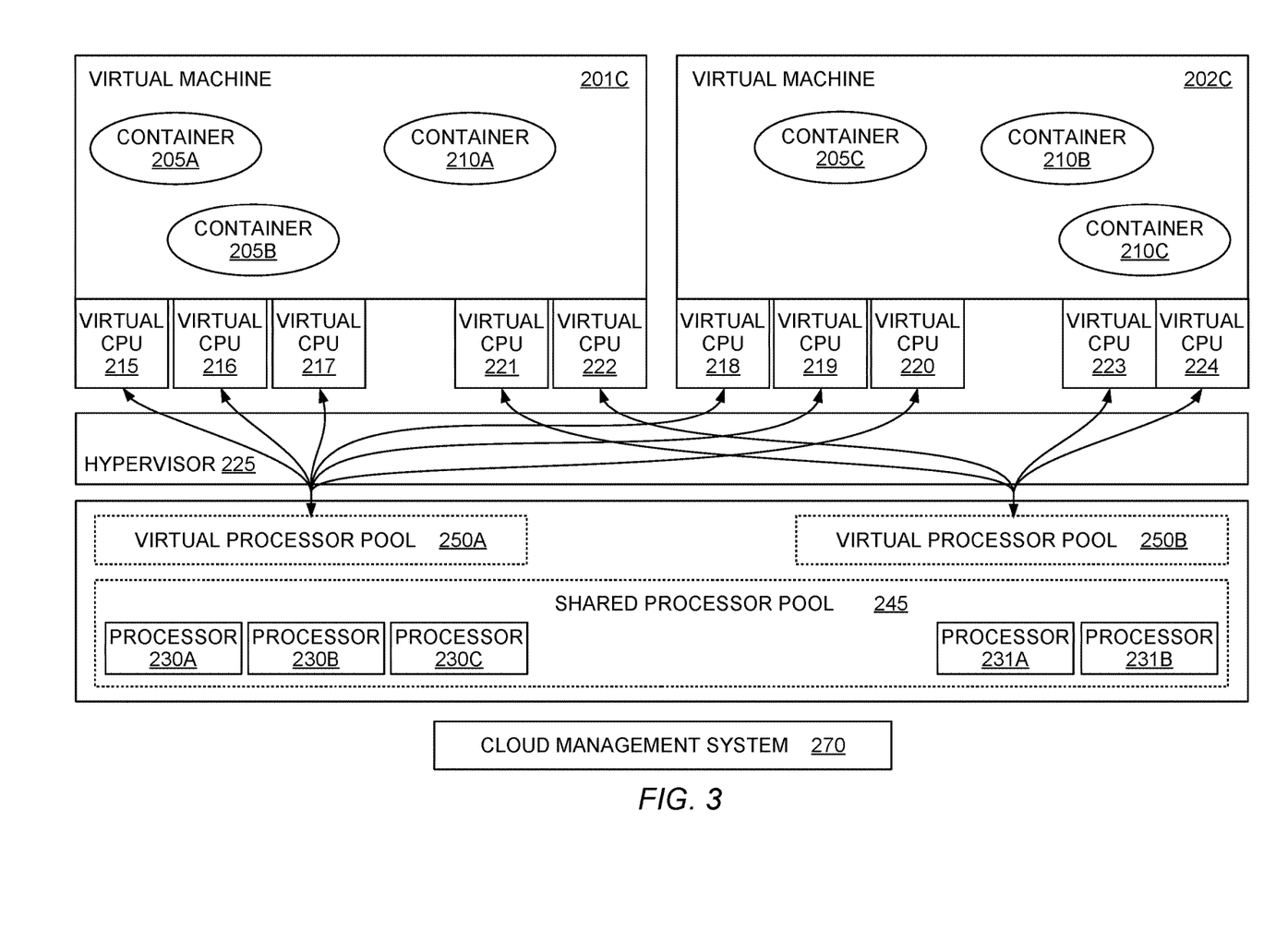
FIG. 3 is a block diagram illustrating a system configured to implement one embodiment of the present disclosure.

FIG. 3 illustrates a block diagram of a system configured to implement one embodiment of the present disclosure. FIG. 4 comprises Virtual Machines 201c and 202c. Virtual Machine 201c hosts Containers 205a, 205b, and 210a while Virtual Machine 202c hosts Containers 205c, 210b, and 210c. Thus, Virtual Machine 201c is the result of merging Virtual Machines 201a and 201b, while Virtual Machine 202c is the merger of Virtual Machines 202a and 202b. Virtual Machine 201c provides Virtual CPUs 215, 216, 217, 221, and 222 to its containers, while Virtual CPUs 218, 219, 220, 223, and 224 are located on Virtual Machine 202c. Additionally, Shared Processor Pool 245 has been created by merging Shared Processor Pools 235 and 240, such that all of the illustrated physical processors are now included in a single pool. As before, Hypervisor 225 controls the allocation and provision of resources to Virtual Machines 201c and 202c, and provides processing power from Shared Processor Pool 245, which comprises Processors 230a, 230b, 230c, 231a, and 231b. FIG. 3 also contains Virtual Processor Pools 250a and 250b. In the illustrated embodiment, the Virtual Processor Pools 250a and 250b operate as an additional layer between Shared Processor Pool 245 and the Virtual Machines 201c and 202c. Virtual Processor Pool 250a contains Processor 230a, 230b, and 230c, while Virtual Processor Pool 250b comprises Processors 231a and 231b. In some embodiments, Virtual Processor Pools 250a and 250b may be turned off when not needed, for example, when all of the containers on a given virtual machine are of the same group. In such an environment, disabling the virtual processor pool may be desirable.

In some embodiments, Virtual Processor Pools 250a and 250b may be referred to more generally as virtual resource pools, which can include any resource that is provided by a host system to virtual machines on it. For example, embodiments of the present disclosure may be used to allocate memory, storage, network access, or any other computing resource to the plurality of containers.

In order to allocate resources, Cloud Management System 270 creates and maintains a series of tables or mappings defining the allocation of system resources. This information may stored locally on each server, may be stored on a separate physical machine, or may be stored across multiple machines. In an embodiment, this information is maintained in the form of multiple tables. A container resource group table may be used to define mapping information between groups of containers and the physical CPUs that should be assigned to each group. Additionally, in an embodiment there are one or more virtual processor pool tables which define the resources that should be available to each container, as well as the priority that each container has in relation to the others in the group. In an embodiment, there is a virtual processor pool table for each of the groups of containers. That is, if there are two distinct groups of containers, there are therefore two distinct virtual processor pools and two distinct virtual processor pool tables. In an embodiment, multiple virtual processor pool tables may be combined into a single larger table that maintains the same information.

Figure 4:
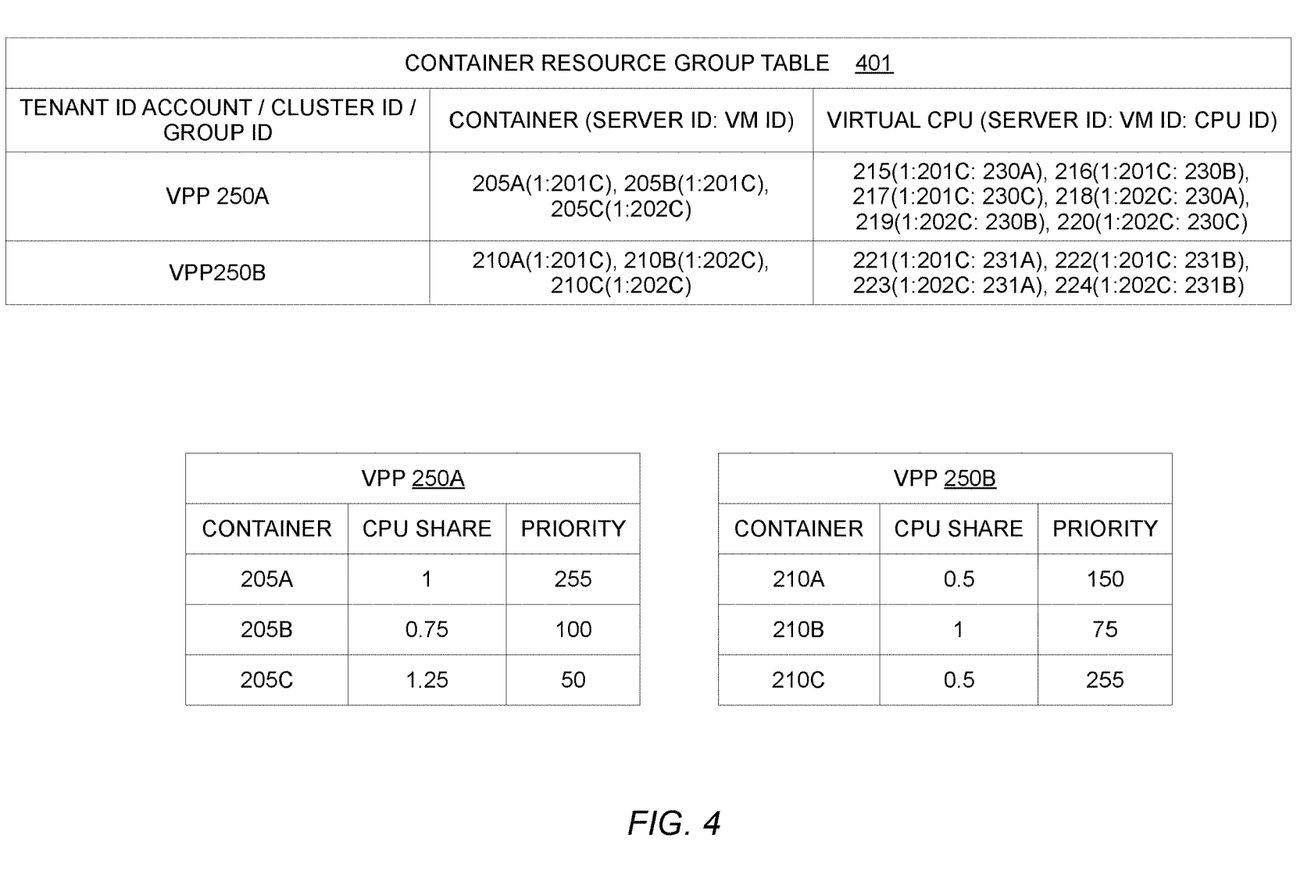
FIG. 4 is a set of tables illustrating the information maintained in one embodiment of the present disclosure.

Turning briefly to FIG. 4, a table labeled Container Resource Group Table 401 is illustrated, as are two tables labeled VPP (Virtual Processor Pool) 250a and VPP 250b. These tables may be maintained on the local server, or may be maintained on a remote machine. As discussed above, in some embodiments the tables are stored across a plurality of machines. Additionally, in some embodiments, this information takes the form of a mapping without any inherent tabular format. This mapping information is maintained by Cloud Management System 270, and used to establish virtual processor pools, which are used by hypervisors to allocate resources. Container Resource Group Table 401 comprises mapping and allocation information about the physical processors and the virtual CPUs. In the illustrated embodiment, Container Resource Group Table 401 includes a reference to each virtual resource pool, a list of containers that are associated with that virtual resource pool as well as their locations, and a list of virtual CPUs that are associated with the respective virtual resource pool as well as their locations and the physical processors that should be allocated to them. Each of these fields may or may not be used in a given architecture. For example, in some embodiments all of the columns of Container Resource Group Table 401 are present. In some embodiments, additional columns may be present. In some embodiments, some information may be absent from the table. For example, some embodiments of the present disclosure may not have information about which containers are associated with each virtual resource group, and may only comprise information about which physical processor to map to each virtual CPU.

As illustrated in FIG. 4, Container Resource Group Table 401 contains a row for VPP 250*a*. In the illustrated embodiment, the column labeled "Container (Server ID: VM ID)" contains information about the containers that are associated with the respective virtual resource pool. As seen in FIG. 3, Virtual Resource Pool 250*a* is associated with Virtual CPU 215, 216, 217, 218, 219, and 220. Additionally, as discussed previously, those Virtual CPU 215, 216 217, 218, 219, and 220 are associated with Containers 205*a*, 205*b*, and 205*c*. Thus, Containers 205*a*, 205*b*, and 205*c* are associated with Virtual Resource Pool 250*a*. Turning back to FIG. 4, we see that the "Container" column in Container Resource Group Table 501 contains the entry "205*a*(1:201*c*), 205*b*(1:201*c*), 205*c*(1:202*c*)". Thus, the Container Resource Group Table 501 contains information that Container 205*a* is located on Virtual Machine 201*c*, which is hosted on server "1". In the illustrated embodiment, there is only a single server, but in some embodiments there are multiple servers operating as part of a cloud system. When there are multiple physical machines operating in the cloud environment, the Container Resource Group Table 401 may be maintained on each machine and kept synchronized or consistent by Cloud Management System 270. Additionally, in some embodiments, Container Resource Group Table 401 may be maintained in a single location, and the information contained therein may be communicated by Cloud Management System 270 when needed.

Continuing with the Container Resource Group Table 401 illustrated in FIG. 4, the column labeled "Virtual CPU (Server ID:VM ID:CPU ID)" contains information about which virtual CPUs should be provided resources from which physical processor. This information prevents processor resources that are intended to be reserved for one group of containers from being used by another group of containers. In FIG. 3, Processors 230*a*, 230*b*, and 230*c* are all associated with Virtual Processor Pool 250*a*, and are thus used to provide the processor resources needed by Virtual CPU 215, 216, 217, 218, 219, and 220. This is reflected in Container Resource Group Table 401, which includes the entry "215 (1:201*c*:230*a*), 216 (1:201*c*:230*b*), 217 (1:201*c*:230*c*), 218 (1:202*c*:230*a*), 219 (1:202*c*:230*b*), 220 (1:202*c*:230*c*)." The first part of that entry, "215 (1:201*c*:230*a*)" indicates that Virtual CPU 215, which is located on Virtual Machine 201*c*, which is hosted on server "1", should receive resources from Processor 230*a*. Thus, Container Resource Group Table 401 provides mapping information between physical processors, virtual processors, and virtual processor pools in a given cloud system.

The tables VPP 250*a* and 250*b*, also illustrated in FIG. 4, also help to define the resources that each container has access to. In some embodiments, these tables are not present on the host system. Each VPP (virtual processor pool) table comprises information about which containers are associated with the pool, what CPU share each container should receive, and what priority each container has in relation to the other containers in the group. For example, as illustrated, VPP 250*a* contains Containers 205*a*, 205*b*, and 205*c*. This reflects the system illustrated in FIG. 3. Additionally, as illustrated in the table for VPP 250*a*, Container 250*a* receives 1 CPU share, and has priority 255.

Hypervisor 225, illustrated in FIG. 3, uses this mapping information in Container Resource Group Table 401 when allocating processor resources. In some embodiments, Hypervisor 225 also refers to the tables VPP 250*a* and 250*b*. For example, rather than simply providing the resources from every processor in Shared Processor Pool 245 to every virtual CPU port on Virtual Machines 201*c* and 202*c*, the resources from Processors 230*a*, 230*b*, and 230*c* are only provided by Hypervisor 225 to the subset of virtual CPUs that are assigned to them. In this way, the problem discussed above is solved: containers are differing groups are prevented from utilizing the resources that should be reserved only for use within the same group of containers.

At times a container may be migrated from one server to another within the cloud system. Although in some embodiments the migration occurs from one server to another, in some embodiments containers migrate to different virtual machines within the same server. The migration process described is equally applicable to both embodiments.

Figure 5:
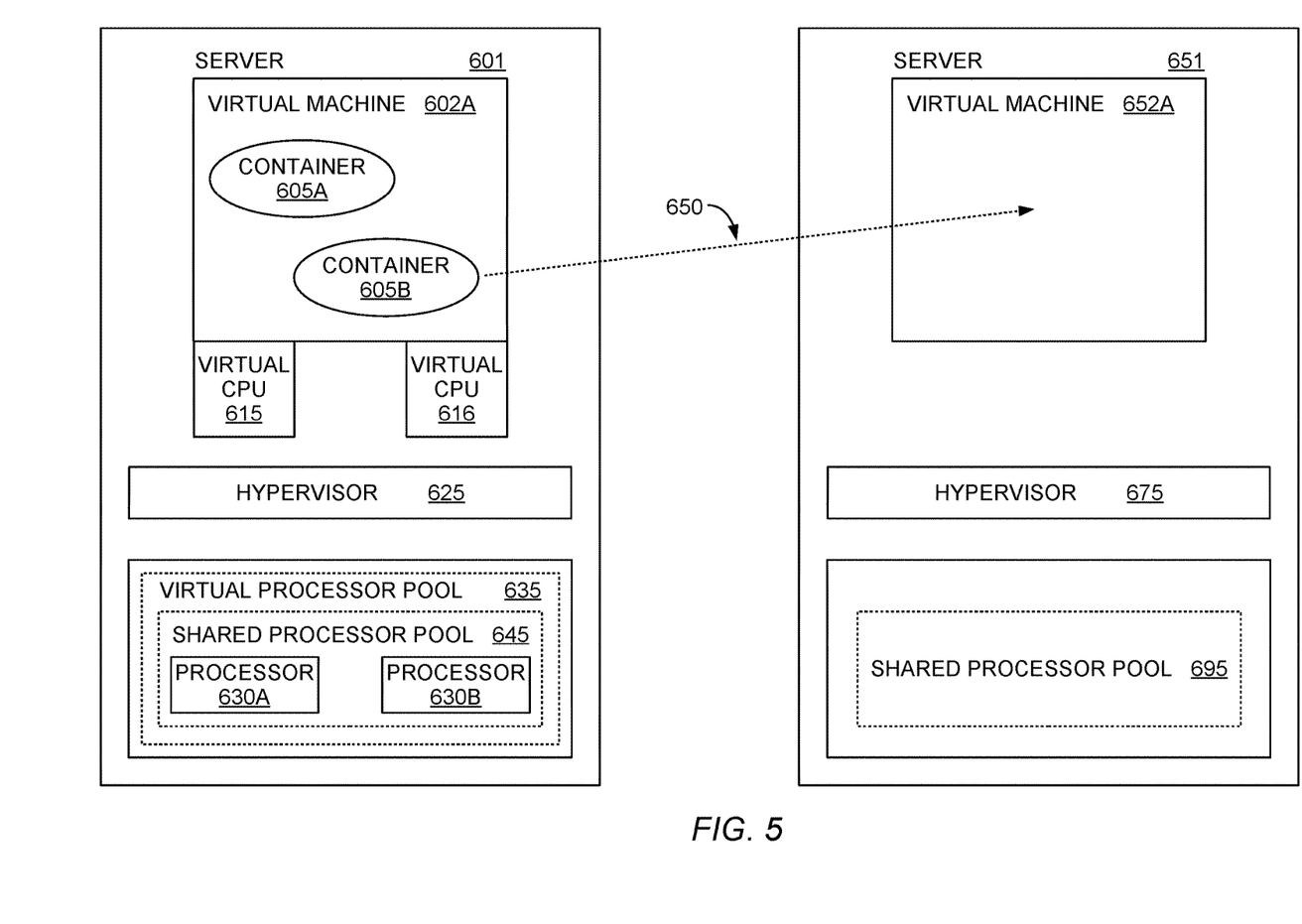
FIG. 5 is a block diagram of a virtualized cloud computing environment configured to implement one embodiment of the present disclosure.
Figure 6:
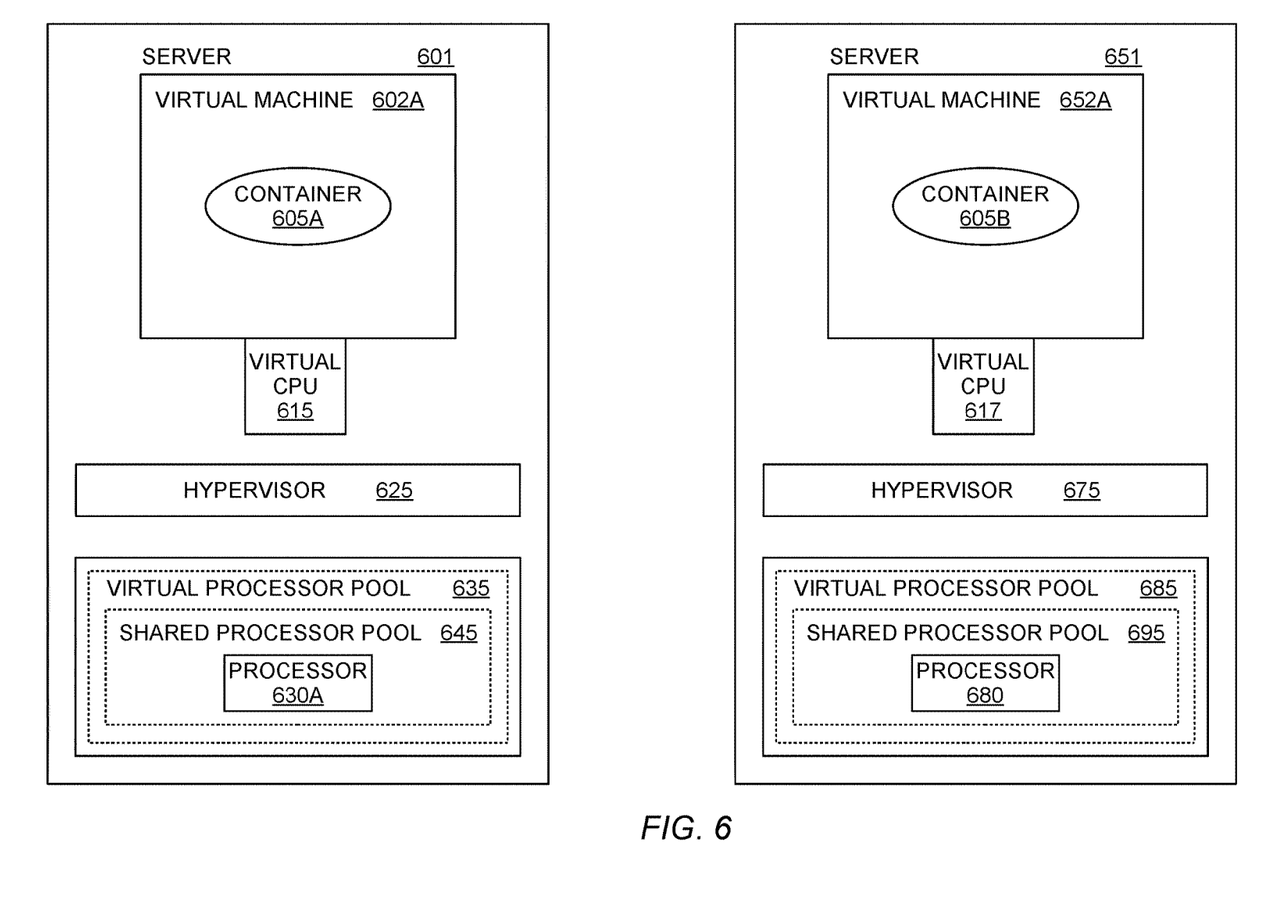
FIG. 6 is a block diagram of a virtualized cloud computing environment configured to implement one embodiment of the present disclosure.

Turning now to FIG. 5, a migration of Container 605*b* from Virtual Machine 602*a*, hosted on Server 601, to Virtual Machine 652*a*, hosted on Server 651, is represented by arrow 650. FIG. 5 illustrates two servers in a cloud system, according to one embodiment of the present disclosure. In many embodiments, however, there are more than two servers in the cloud system and the migration could be between any of them. Similarly, in some embodiments, there is only a single server, or the migration occurs between virtual machines on a single server. FIG. 5 illustrates the environment before the migration occurs, while FIG. 6 illustrates the environment after the migration has completed. As depicted in FIG. 5, Server 601 hosts Virtual Machine 602*a*, which is currently hosting/running Containers 605*a* and 605*b*. Virtual Machine 602*a* presents Virtual CPUs 615 and 616 provide processing power to Containers 605*a* and 605*b*. Hypervisor 625 provides resources from processors in Virtual Processor Pool 635 to Virtual Machine 602*a*. In the illustrated embodiment, only Shared Processor Pool 645 is illustrated, and only Processors 630*a* and 630*b* are included in the pool. Of course, there could be other processors that are not included within Shared Processor Pool 645, and there could be processors that are a part of Shared Processor Pool 645 but are not associated with Virtual Processor Pool 635. Only the processors that are associated with both Shared Processor Pool 645 and Virtual Processor Pool 635 are illustrated, for the sake of simplicity.

Not illustrated in FIGS. 5 and 6 is Cloud Management System 270, though it is still present in the system. As discussed above, Cloud Management System 270 could be a distinct physical machine from either Server 601 or 651. In some embodiments, Cloud Management System 270 is contained within one physical server and communicates between servers. In some embodiments, Cloud Management System 270 is distributed across multiple servers such as Server 601 and 651, and communicates to maintain synchronization. For example, when a container is instantiated, migrated, stopped, or any other change occurs, the Cloud Management System 270 component on the server where the container was initialized may send a notification to all other Cloud Management Systems with information about the change.

As illustrated in FIG. 5, Server 651 hosts Virtual Machine 652a, which is depicted as having no containers hosted on it and no virtual CPUs. Of course, Virtual Machine 652a could have containers already running, but they are not illustrated for the sake of simplicity as they have no effect on the migration process. The lack of depicted containers simply indicates that there are currently no containers on Server 651 that are in the same group or association as Containers 605a and 605b. Similarly, Server 651 contains Hypervisor 675 and Shared Processor Pool 695, though no processors are depicted. Of course, there may be one or several processors as part of Server 651, however, none are illustrated in FIG. 5 to indicate that there are currently no processors assigned or allocated to Virtual Process Pool 635.

Figure 7:
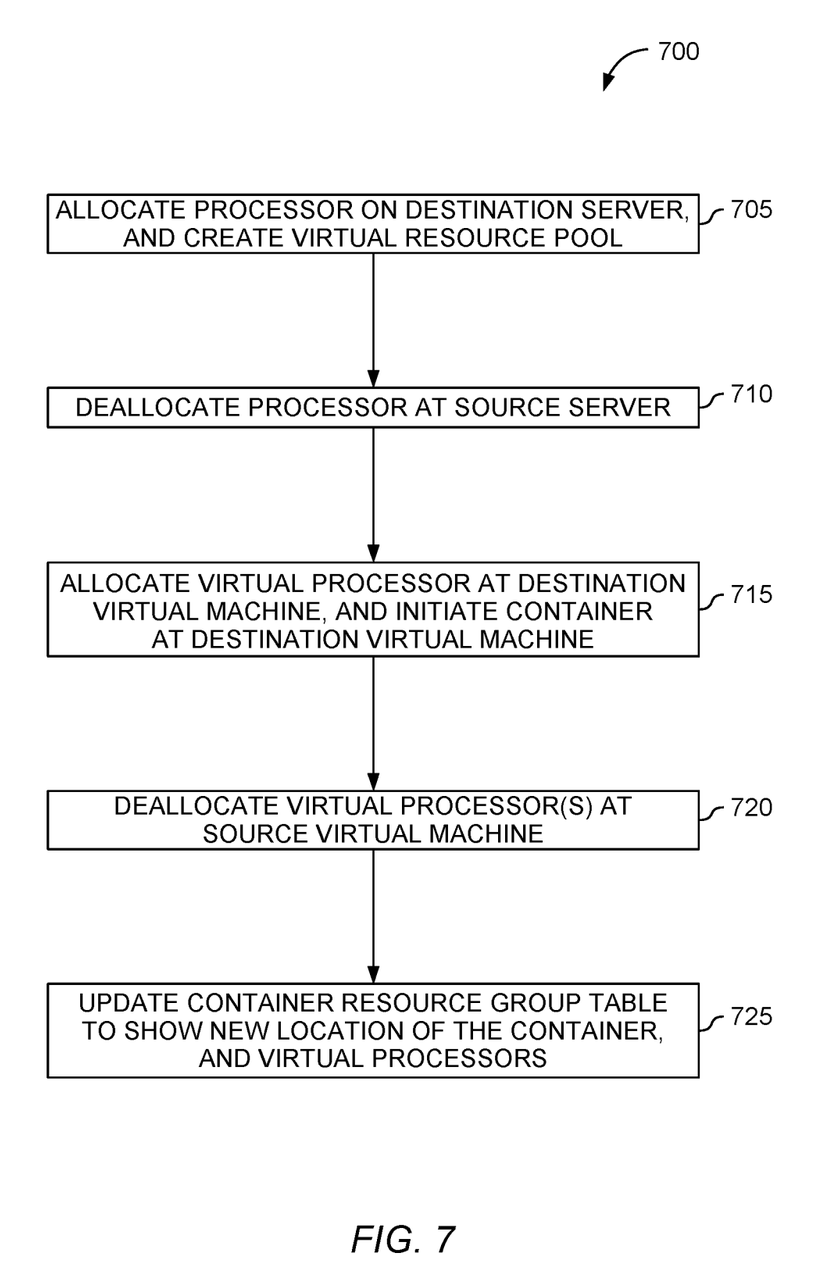
FIG. 7 is a flow diagram illustrating a method for resource pooling, according to one embodiment of the present disclosure.

FIG. 7 illustrates a method 800 of migrating a container to a new virtual machine, according to one embodiment of the present disclosure. The method 800 begins at block 705, where Cloud Management System 270 allocates one or more processors on the destination server, and a virtual resource pool is created. This can be seen in FIG. 6, where Processor 680 has been allocated to Shared Processor Pool 695, and Virtual Resource Pool 685 has been created. Note that although Virtual Resource Pool 685 has a different label than Virtual Resource Pool 635, in some embodiments they are in fact the same pool and refer to the same virtual resource pool table (as illustrated in FIG. 4). The method 700 continues to block 710, where the Cloud Management System 270 deallocates one or more processors at the source server. This is to ensure that the number of licenses/cores/processors being used by the client remains the same before and after the migration. This can be seen in FIG. 6 as well, where Processor 630b is no longer allocated to Shared Processor Pool 645, or at least is no longer allocated to Virtual Resource Pool 635 and thus will no longer be available to provide resources to Container 605a.

The method 700 continues at block 715, where the hypervisor on the destination server allocates one or more virtual processors at the destination virtual machine, and the destination virtual machine initializes the container. This can be seen in FIG. 6, where Container 605b is now running on Virtual Machine 652a, and Virtual CPU 617 has been allocated to provide resources to the container. The number of virtual processors that are allocated may vary based on a variety of factors which are discussed in more detail below. Next, the method 700 proceeds to block 720 where the source hypervisor deallocates one or more virtual processors at the source virtual machine. This is illustrated in FIG. 6, where Virtual CPU 616 is no longer in use. The number of virtual processors that are deallocated at the source virtual machine may vary according to a variety of factors, which are discussed in more detail below.

Finally, the method 700 proceeds to block 725, where the Cloud Management System updates the container resource group table to indicate the new position of the migrated container, as well as the various changes that were made to virtual processors. In some embodiments, this updating step may comprise communicating that updated information to the plurality of physical machines where the container resource group table is maintained. A portion of the container resource group table that represents the system as it existed before the migration is provided in Table 1.

TABLE 1

Pre-Migration Container Resource Group Table
Container Resource Group
Table (Pre-Migration)

| Tenant ID Account/ Cluster ID/Group ID | Container (Server ID:VM ID) | Virtual CPU (Server ID:VM ID:CPU ID) |
|---|---|---|
| Virtual Processor Pool 635 | 605a (601:602a), 605b (601:602a) | 615 (601:602a:630a), 616 (601:602a:630b) |

The updated container resource group table is depicted in Table 2.

TABLE 2

Post-Migration Container Resource Group Table
Container Resource Group
Table (Post-Migration)

| Tenant ID Account/ Cluster ID/Group ID | Container (Server ID:VM ID) | Virtual CPU (Server ID:VM ID:CPU ID) |
|---|---|---|
| Virtual Processor Pool 635 | 605a (601:602a), 605b (602:652a) | 615 (601:602a:630a), 617 (602:652a:680) |

As can be seen in the tables, the location of Container 605b has been updated from Server 601, Virtual Machine 602a to instead be Server 602, Virtual Machine 652a. Additionally, the Virtual CPU mapping has been updated to indicate that Virtual CPU 616 has been deallocated and Processor 630b is no longer allocated to this group, but that Virtual CPU 617 has been allocated on Server 602, Virtual Machine 652a, and that physical Processor 680 has been allocated to it. Thus, container migration is achieved.

In some embodiments, the number of virtual processors that are allocated at the destination and source virtual machines after a migration varies based on a variety of factors. In one embodiment, virtual CPUs are allocated and deallocated to maintain virtual processor capacity after the migration. When a container migrates, virtual processor capacity at the source virtual machine decreases because one or more physical processors are deallocated from the pool, leaving fewer processor resources serving the same number of virtual CPUs. Similarly, virtual processor capacity at the destination virtual machine may be different from the capacity before migration, depending on how many virtual processors and physical processors are allocated. Thus, in this embodiment, virtual processors are deallocated at the source virtual machine and allocated at the destination virtual machine so that the relative capacity of each virtual CPU remains as close to the pre-migration levels as possible. As used in the present disclosure, virtual CPU capacity, power, or factor refers to the ratio of physical processors to virtual processors that are allocated to a given group. In order to maintain virtual CPU capacity, it is important to first define the relevant variables. Table 3 defines the relevant variables for this embodiment.

TABLE 3

Virtual CPU Capacity Variables

| Variable | Meaning |
|---|---|
| BvF | Virtual CPU capacity (factor) before migration |
| AvFS | Virtual CPU capacity (factor) at the source virtual machine after migration |
| TvF | Threshold Virtual CPU capacity (factor) |
| BP | Number of physical processors allocated to the |

TABLE 3-continued

Virtual CPU Capacity Variables

| Variable | Meaning |
|---|---|
| | virtual processor pool before migration |
| APS | Number of physical processors allocated to the virtual processor pool at the source virtual machine after migration |
| APD | Number of physical processors allocated to the virtual processor pool at the destination virtual machine after migration |
| BvP | Number of virtual processors allocated to the group before migration |
| AvPS | Number of virtual processors allocated to the group at the source virtual machine after migration |
| AvPD | Number of virtual processors allocated to the group at the destination virtual machine after migration |

The first relevant equation is used to calculate the Virtual CPU capacity before the migration occurred. This value becomes relevant when determining how many virtual CPUs should be allocated at each virtual machine after the migration is completed. The equation for Virtual CPU Factor Before Migration is given in Equation 1.

$$BvF = BP/BvP \qquad \text{Equation 1}$$

Virtual CPU Factor Before Migration

Thus, according to Equation 1, Virtual CPU capacity before migration is equal to the number of physical processors that were allocated to the virtual processor pool which was associated with the migrating container before the migration occurred, divided by the number of virtual processors that were associated with the migrating container before the migration occurred. To give an example, in the illustrated embodiment of FIG. 5, BP is two because there were two physical processors, Processors 630a and 630b, allocated to the Shared Processor Pool 635 which was associated with the migrating Container 605b. In the same figure, BvP is two as well, because there are two virtual processors, Virtual CPUs 615 and 616, allocated to the group containing the migrating Container 605b. Thus, in the illustrated embodiment, BvF is two divided by two, which equals one. The Virtual CPU Factor before migration, as illustrated in FIG. 5, is one.

The second relevant equation is used to calculate the Virtual CPU capacity on the source machine after the migration occurred. Unless one or more virtual CPUs are deallocated at the source virtual machine, this value will be lower than BvF because one or more physical processors are deallocated to allow for an equal number of physical processors to be allocated at the destination machine. The equation for Virtual CPU Factor at the source after migration is given in Equation 2.

$$AvFS = APS/AvPS \qquad \text{Equation 2}$$

Virtual CPU Factor After Migration, at Source Virtual Machine

Thus, according to Equation 2, Virtual CPU capacity at the source after the migration is equal to the number of physical processors on the source machine that are allocated to the virtual processor pool that was associated with the migrating container (after one or more have been deallocated), divided by the number of virtual processors that are allocated to the same virtual processor pool after the migration is completed. As an example, in the illustrated embodiment of FIG. 6, APS is one because there is only a single physical processor, Processor 630a, allocated to Virtual Processor Pool 645. Similarly, AvPS is one because there is only a single virtual CPU, Virtual CPU 615, associated with Virtual Processor Pool 635.

Thus, AvFS is one divided by one, which equals one. Therefore, in the illustrated embodiment, the virtual CPU capacity before migration is equal to the virtual CPU capacity after migration, and no other balancing is required. In some embodiments, this calculation may be completed before any virtual CPUs are deallocated at the source virtual machine, and Cloud Management System 270 and/or Hypervisor 225 remove virtual CPUs based on the result. In the illustrated embodiment, if Virtual CPU 616 had not yet been deallocated, AvPS would be one divided by two, or one half. Thus, virtual CPU capacity would have been cut in half by the migration.

The third relevant equation is used to calculate the number of virtual CPUs that should be allocated at the source virtual machine in order to maintain capacity as closely as possible. In some embodiments, this equation is used to determine the number of virtual CPUs to be deallocated at the source virtual machine once a migration has been completed. The equation for the number of virtual CPUs that should be allocated at the source virtual machine in order to maintain as capacity as closely as possible is given in Equation 3.

$$AvPS = 1/(BvF * APS) \qquad \text{Equation 3}$$

Number of Virtual CPUs to be Allocated at the

Source Virtual Machine After Migration

Thus, according to Equation 3, the number of virtual CPUs that should be associated with the group at the source virtual machine is equal to one divided by the product of virtual CPU capacity before migration and the number of physical processors allocated to the associated virtual processor pool at the source virtual machine after the migration. In the illustrated embodiment of FIGS. 5 and 6, BvF is one, as discussed above. APS is one because there is a single physical processor, Processor 630a, allocated to Virtual Processor Pool 635 once the migration has been completed and Processor 630b has been deallocated.

According to Equation 3, AvPS is equal to one divided by the product of one times one, which equals one. Therefore, there should be one virtual CPU allocated to the group in order to maintain capacity. As discussed above, if Virtual CPU 616 had not been deallocated until after these calculations were completed, the result would still be one. In such an embodiment, Cloud Management System 270, Hypervisor 225, or some other component can simply deallocate virtual CPUs associated with the group until the number remaining is equal to AvPS. In some instances, the result for AvPS may be less than one. Therefore, in some embodiments, it is necessary to let AvPS equal one if the result of the above equation is less than one. This can be achieved with a formula such as max(x,y), where X equals one and Y equals AvPS.

The fourth and final relevant equation is used to calculate the number of virtual CPUs that should be allocated at the destination virtual machine in order to maintain capacity as closely as possible. The equation for the number of virtual CPUs that should be allocated at the destination virtual machine in order to maintain as capacity as closely as possible is given in Equation 4.

$$AvPD = 1/(BvF * APD) \quad \text{Equation 4}$$

Number of Virtual *CPUs* to be Allocated at the Destination Machine After Migration Thus, according to Equation 4, the number of virtual CPUs that should be associated with the group at the destination virtual machine is equal to one divided by the product of virtual CPU capacity before migration and the number of physical processors allocated to the associated virtual processor pool at the destination virtual machine after the migration. In the illustrated embodiment of FIGS. 5 and 6, BvF is one, as discussed above. APD is one because there is a single physical processor, Processor 680, allocated to Virtual Processor Pool 685 once the migration has been completed.

According to Equation 4, AvPD is equal to one divided by the product of one times one, which equals one. Therefore, there should be one virtual CPU allocated to the group in order to maintain capacity. In the illustrated embodiment, there is already a single virtual processor, Virtual CPU 617, allocated to the group and no more need be allocated. If AvPD does not equal the number of virtual CPU that are actually allocated, Cloud Management System 270, Hypervisor 225, or some other component can simply allocate virtual CPUs to the group until the number is equal to AvPD. In some instances, the result for AvPD may be less than one. Therefore, in some embodiments, it is necessary to let AvPD equal one if the result of the above equation is less than one. This can be achieved with a formula such as max(x,y), where X equals one and Y equals AvPD.

In some embodiments, the allocation of virtual CPUs at the source virtual machine is only adjusted if the difference in capacity exceeds a threshold, or TvF. In such an embodiment, TvF is a predefined number ranging from zero to one, inclusively. This value could be defined by a user, set by an algorithm, or any other method. In such an embodiment, prior to allocating or deallocating virtual CPUs at the source virtual machine, the system first checks whether the difference between BvF and AvFS is greater than TvF. If so, the above process is completed to adjust the number of virtual CPUs at the source. If not, no further change is made at the source virtual machine. This embodiment may be preferable for some architectures or clients, because it can help to reduce repeated changes when the change in capacity is not great.

In some embodiments, rather than attempt to maintain virtual CPU capacity, it is preferable to enact the minimum change necessary. Such an embodiment may be preferable when containers move frequently. Additionally, in such an embodiment, the relative capacities of each virtual CPU may be diminished, but the overall number is not changed. This can be particularly useful for multithreaded workloads. In such an embodiment, AvPS simply remains the same, and AvPD is set to the same number. Thus, if there were two virtual CPUs at the source virtual machine, there will be two virtual CPUs allocated at the destination virtual machine. In some embodiments, it is preferable to limit the number of virtual CPUs so that it is not excessive. For example, in some embodiments AvPS is set to twenty times APD, or BvP, whichever is less. Thus, the number of virtual CPUs at the source will not exceed twenty virtual processors for each physical processor. Similarly, in such an embodiment, AvPD may be set to twenty times BPD, or BvP, whichever is less.

Figure 8:
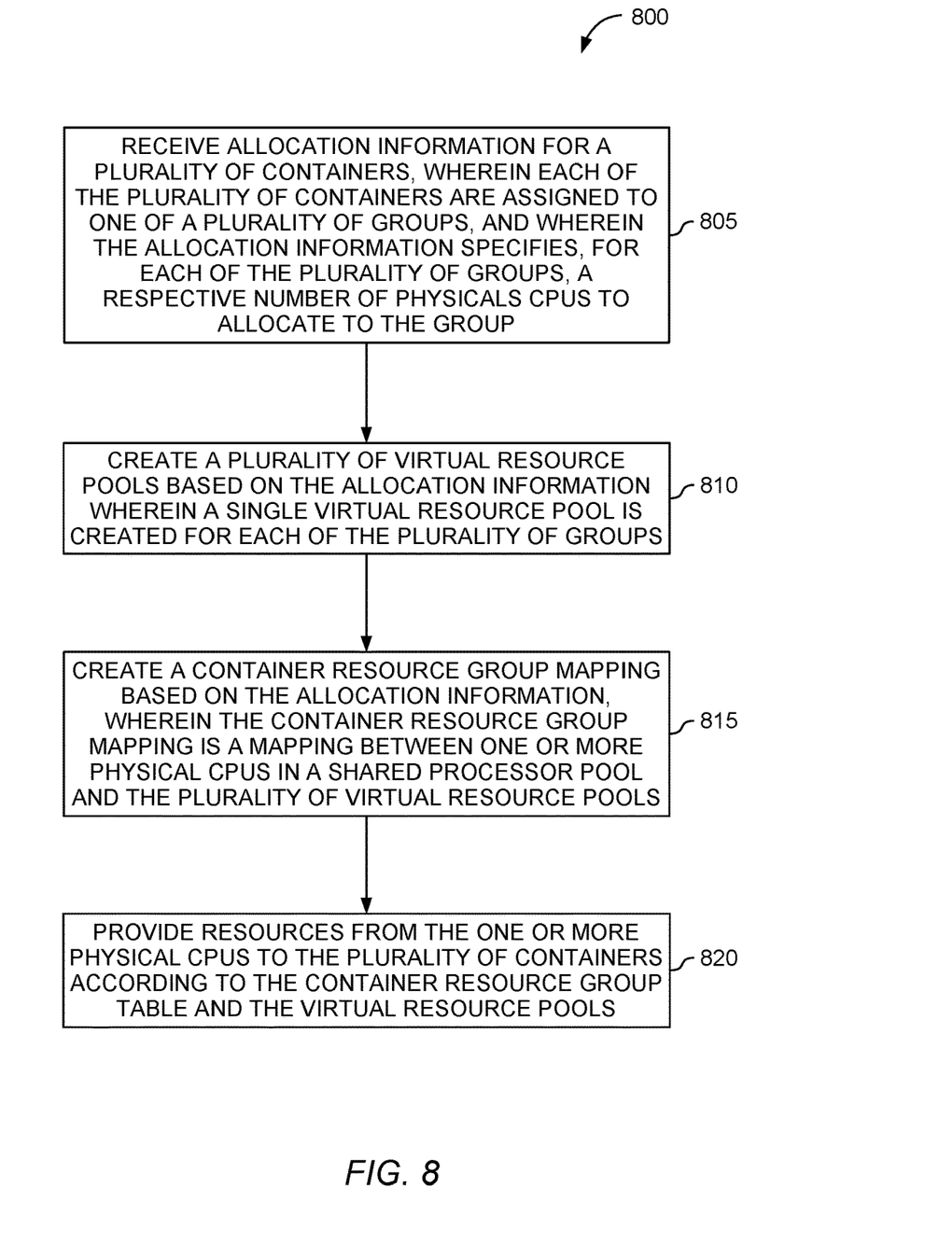
FIG. 8 illustrates a method of resource pooling, according to one embodiment of the present disclosure.

FIG. 8 illustrates a method 800 of resource pooling, according to one embodiment of the present disclosure. The method 800 begins at block 805, where allocation information for a plurality of containers is received at a Cloud Management System 270, wherein each of the plurality of containers are assigned to one of a plurality of groups, and wherein the allocation information specifies, for each of the plurality of groups, a respective number of physical CPUs to allocate to the group. The method continues at block 810, where Cloud Management System 270, Hypervisor 225, or a similar component creates a plurality of virtual resource pools based on the allocation information, wherein a single virtual resource pool is created for each of the plurality of groups. Next, at block 815, a Cloud Management System 270, Hypervisor 225, or a similar component creates container resource group mapping based on the allocation information, wherein the container resource group mapping is a mapping between one or more physical CPUs in a shared processor pool and the plurality of virtual resource pools. Finally, the method 800 continues to block 820 where Hypervisor 225 provides resources from the one or more physical CPUs to the plurality of containers according to the container resource group table and the virtual resource pools.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of resource pooling, the method implemented with a computer system having a processor coupled to memory-stored instructions which, when executed by the processor, cause to processor to perform the resource pooling method, comprising:
   receiving allocation information for a plurality of containers, wherein each of the plurality of containers are assigned to one of a plurality of groups, and wherein the allocation information specifies, for each of the plurality of groups, a respective number of physical CPUs to allocate to the group;
   creating a plurality of virtual resource pools based on the allocation information wherein a single virtual resource pool is created for each of the plurality of groups;
   creating a container resource group mapping based on the allocation information, wherein the container resource group mapping is a mapping between one or more physical CPUs in a shared processor pool and the plurality of virtual resource pools; and
   providing resources from the one or more physical CPUs to the plurality of containers according to the container resource group mapping and the virtual resource pools.

2. The method of claim 1, wherein the plurality of containers are running on a single virtual machine.

3. The method of claim 2, wherein a first subset of the plurality of containers are assigned to a first group and a second subset of the plurality of containers are assigned to a second group, and wherein the first group is not given access to resources that the second group has access to and the second group is not given access to resources that the first group has access to.

4. The method of claim 3, wherein the allocation information further comprises a priority assigned to each of the containers.

5. The method of claim 1, wherein the allocation information further specifies a percentage of the respective number of physical CPUs allocated to the group to allocate to each of the plurality of containers.

6. The method of claim 1, wherein each of the plurality of containers is a data structure that isolates its contents from contents of other containers.

7. The method of claim 1, the method further comprising:
   receiving an indication that a new container is being migrated to a destination server from a source server;
   creating a new virtual resource pool on the destination server based on determining that the destination server is not yet hosting any containers associated with a new group which the new container is associated with;
   allocating one or more physical CPUs on the destination server to the new virtual resource pool;
   updating the container resource group mapping to indicate that the new container has migrated to the destination server; and
   providing resources from the one or more physical CPUs to the new container according to the updated container resource group mapping and the new virtual resource pool.

8. The method of claim 7, the method further comprising:
   determining a destination number of virtual CPUs to allocate to the new virtual resource pool based on a number of physical processors that were allocated to a source virtual resource pool that was associated with the new container before migrating the new container, and a source number of virtual CPUs that were allocated to the source virtual resource pool; and
   allocating the destination number of virtual CPUs to the new virtual resource pool.

9. The method of claim 7, the method further comprising:
   allocating a number of virtual CPUs to the new virtual resource pool based on a number of virtual CPUs that were allocated to a source virtual resource pool before migrating the new container, wherein the new container was associated with the source virtual resource pool before the migration.

10. The method of claim 1, the method further comprising:
    receiving an indication that a first container is being migrated to a destination server from a source server, wherein the first container is associated with a first group and wherein the first group is associated with a first virtual resource pool;
    updating the first virtual resource pool by deallocating one or more physical CPUs from the first virtual resource pool; and
    updating the container resource group mapping based on the indication to indicate that the first container has migrated to the destination server.

11. The method of claim 10, the method further comprising:
    determining a number of virtual CPUs to allocate to the first virtual resource pool after migrating the first container, based on a number of physical processors that are allocated to the first virtual resource pool after the migration, a number of physical processors that were allocated to the first virtual resource pool before the migration, and a number of virtual CPUs that were allocated to the first virtual resource pool before the migration; and
    allocating or deallocating virtual CPUs to the first virtual resource pool based on the determined number of virtual CPUs to allocate to the first virtual resource pool.

12. The method of claim 11, wherein allocating or deallocating virtual CPUs to the first virtual resource pool is further based on determining that a difference between a first virtual CPU factor for the first virtual resource pool before migration and a second virtual CPU factor for the first virtual resource pool after migration exceeds a user defined threshold.

13. The method of claim 10, the method further comprising:
    allocating a number of virtual CPUs to the first virtual resource pool based on a number of virtual CPUs that were allocated to a first virtual resource pool before migrating the first container, wherein the first container was associated with a source virtual resource pool before migrating the first container.

14. A system, comprising:
    one or more computer processors; and
    a memory containing computer program code that, when executed by operation of the one or more computer processors, performs an operation comprising:
        receiving allocation information for a plurality of containers, wherein each of the plurality of containers are assigned to one of a plurality of groups, and wherein the allocation information specifies, for each of the plurality of groups, a respective number of physical CPUs to allocate to the group;
        creating a plurality of virtual resource pools based on the allocation information wherein a single virtual resource pool is created for each of the plurality of groups;

creating a container resource group mapping based on the allocation information, wherein the container resource group mapping is a mapping between one or more physical CPUs in a shared processor pool and the plurality of virtual resource pools; and providing resources from the one or more physical CPUs to the plurality of containers according to the container resource group mapping and the virtual resource pools.

15. The system of claim 14, wherein the plurality of containers are running on a single virtual machine, and wherein a first subset of the plurality of containers are assigned to a first group and a second subset of the plurality of containers are assigned to a second group, and wherein the first group is not given access to resources that the second group has access to and the second group is not given access to resources that the first group has access to.

16. The system of claim 14, the operation further comprising:

receiving an indication that a new container is being migrated to a destination server from a source server;

creating a new virtual resource pool on the destination server based on determining that the destination server is not yet hosting any containers associated with a new group which the new container is associated with;

allocating one or more physical CPUs on the destination server to the new virtual resource pool;

updating the container resource group mapping to indicate that the new container has migrated to the destination server; and providing resources from the one or more physical CPUs to the new container according to the updated container resource group mapping and the new virtual resource pool.

17. The system of claim 16, the operation further comprising:

determining a destination number of virtual CPUs to allocate to the new virtual resource pool based on a number of physical processors that were allocated to a source virtual resource pool that was associated with the new container before migrating the new container, and a source number of virtual CPUs that were allocated to the source virtual resource pool; and allocating the destination number of virtual CPUs to the new virtual resource pool.

18. The system of claim 14, the operation further comprising:

receiving an indication that a first container is being migrated to a destination server from a source server, wherein the first container is associated with a first group and wherein the first group is associated with a first virtual resource pool;

updating the first virtual resource pool by deallocating one or more physical CPUs from the first virtual resource pool; and updating the container resource group mapping based on the indication to indicate that the first container has migrated to the destination server.

19. The system of claim 18, the operation further comprising:

determining a number of virtual CPUs to allocate to the first virtual resource pool after the migration based on a number of physical processors that are allocated to the first virtual resource pool after the migration, a number of physical processors that were allocated to the first virtual resource pool before migrating the new container, and a number of virtual CPUs that were allocated to the first virtual resource pool before migrating the new container; and allocating or deallocating virtual CPUs to the first virtual resource pool based on the determined number of virtual CPUs to allocate to the first virtual resource pool.

20. A computer-readable storage medium containing computer-readable program code that, when executed by operation of one or more computer processors, performs an operation comprising:

receiving allocation information for a plurality of containers, wherein each of the plurality of containers are assigned to one of a plurality of groups, and wherein the allocation information specifies, for each of the plurality of groups, a respective number of physical CPUs to allocate to the group;

creating a plurality of virtual resource pools based on the allocation information wherein a single virtual resource pool is created for each of the plurality of groups;

creating a container resource group mapping based on the allocation information, wherein the container resource group mapping is a mapping between one or more physical CPUs in a shared processor pool and the plurality of virtual resource pools; and providing resources from the one or more physical CPUs to the plurality of containers according to the container resource group mapping and the virtual resource pools.

* * * * *